Sept. 1, 1959    H. HOFFMANN    2,902,011
INJECTION TYPE INTERNAL COMBUSTION ENGINE
Filed Jan. 28, 1957    2 Sheets-Sheet 1

INVENTOR
HEINRICH HOFFMANN

BY Duree and Cray

ATTORNEYS

Sept. 1, 1959 H. HOFFMANN 2,902,011
INJECTION TYPE INTERNAL COMBUSTION ENGINE
Filed Jan. 28, 1957 2 Sheets-Sheet 2

INVENTOR
HEINRICH HOFFMANN

BY *Dicke and Gray*

ATTORNEYS

United States Patent Office 2,902,011
Patented Sept. 1, 1959

2,902,011

INJECTION TYPE INTERNAL COMBUSTION ENGINE

Heinrich Hoffmann, Stuttgart-Untertuerkheim, Germany, assignor to Daimler-Benz Aktiengesellschaft, Stuttgart-Untertuerkheim, Germany Application January 28, 1957, Serial No. 636,698

Claims priority, application Germany February 10, 1956

18 Claims. (Cl. 123—32)

The present invention relates to internal combustion engines of the compression ignition type, and more particularly to a combustion chamber arrangement including a main combustion chamber having approximately the shape of a body of revolution arranged within the piston head of the engine piston and an auxiliary chamber arranged within the cylinder head of the engine which is in continuous communication with the main combustion chamber by means of a communicating passage into which an injection nozzle discharges the fuel consisting of a plurality of jets.

The present invention consists essentially in that the injection nozzle or plurality of injection nozzles direct one jet of fuel, or a plurality of jets, into and across the auxiliary chamber and a second jet, or a plurality of jets into the main combustion chamber along the walls of the communicating passage arranged between the auxiliary chamber and the main combustion chamber, whereby the location and shape of the main combustion chamber, the communicating passage and the second-mentioned fuel jet are so chosen in relation to each other that this second-mentioned fuel jet, discharging from the communicating passage, is directed into the main combustion chamber, especially as viewed in a plane transverse to the piston, essentially tangentially along the walls of the main combustion chamber and is guided therealong.

Internal diesel combustion engines are known in the prior art in which a fuel jet is directed in a somewhat similar manner tangentially along the walls of a combustion chamber located in the piston head and more particularly from a nozzle located on the cylinder head the discharge orifice of which slightly projects into the piston chamber. Such engines operate on the principle of having the liquid fuel guided, for a given length of time, along the relatively cool chamber walls where the fuel gradually evaporates and then mixes or combines with the combustion air which flows in the same direction.

It is obvious that such engines present certain difficulties during starting thereof because the combustion chamber, that is, the walls thereof, are still cold at that time which, as a consequence, prevents self-ignition of the fuel or at least strongly retards it.

Such engines, therefore, necessitate certain compromises in that the fuel, before being permitted to come in contact with the chamber walls, is at first guided over a longer or shorter distance through the air so that, in starting up a cold engine, the heat of the compressed air takes over the task of igniting the fuel.

With the present invention, the necessity for such compromises are avoided because one of the fuel jets discharged from the nozzle is directed into a separate ignition chamber, and more particularly into the hot compressed air of an auxiliary chamber without touching the walls thereof while a second jet, also discharged from the nozzle, is directed, immediately after discharge from the nozzle, along the walls, that is, first along the walls of the communicating passage and then along the walls of the main combustion chamber into the piston head.

For aiding self-ignition with extremely cold engines, a glow plug may be incorporated in the auxiliary chamber.

Inasmuch as the auxiliary chamber in the cylinder head is assigned only the functions of an ignition chamber, its volume can be much smaller than that of the main combustion chamber in the piston head.

According to a further characteristic of the present invention, the injection nozzle may terminate or discharge in proximity of the transitional portion between the auxiliary chamber and the communicating passage. It is further preferable that the two fuel sprays or jets or the two groups of sprays or jets, if such are used, are injected at different times and further, that different quantities of fuel are injected by each jet or group of jets.

It is further proposed according to the present invention to arrange the communicating passage at an angle of from 25° to 45° in relation to a plane perpendicular to the axis of the cylinder and to terminate this communicating passage eccentrically with respect to the center of the opening of the main combuston chamber, as viewed in a plan view of the piston.

Furthermore, it is advantageous to produce, in any suitable well-known manner, a rotation of the air in the main combustion chamber at the end of the compression stroke in a direction so that the air flows in the same direction as the fuel spray after discharge thereof from the communicating passage, i.e., in such a manner that uniflow rotation of both combustion air and fuel is obtained.

It is of particular advantage in the present arrangement to maintain the auxiliary chamber in the cylinder head as warm as possible which may be accomplished in any suitable known manner such as by poor cooling of the auxiliary chamber or by constructing it as a heat-insulated insert, whereas the main combustion chamber is kept as cool as possible in any suitable manner.

Accordingly, it is an object of the present invention to provide a compression ignition type internal combustion engine which assures proper starting of the engine at all times without regard to engine temperatures.

It is another object of the present invention to provide an internal combustion engine and more particularly a combustion arrangement therefor which improves the combustion efficiency, especially the self-ignition of the injected fuel under all operating conditions.

Still another object of the present invention resides in the provision of a combustion chamber arrangement in a compression-ignition type internal combustion engine in which a part of the fuel is injected into an auxiliary chamber while the remaining part of the fuel is injected into the main combustion chamber.

Still another object of the present invention is to provide an internal combustion engine of the compression-ignition type in which the disadvantages and compromises of the prior art are resolved in a most favorable manner.

A further object of the present invention resides in the particular arrangement and relationship of the main combustion chamber, the auxiliary combustion chamber, the injection means and the communicating passage between the combustion chambers which improves the combustion efficiency of the engine by assuring proper ignition and combustion of the fuel.

These and further objects, features and advantages of the present invention will become more obvious from the following description of a combustion chamber arrangement in accordance with the present invention when taken in connection with the accompanying drawing which shows, for purposes of illustration only, one preferred embodiment in accordance with the present invention and wherein.

Figure 1:
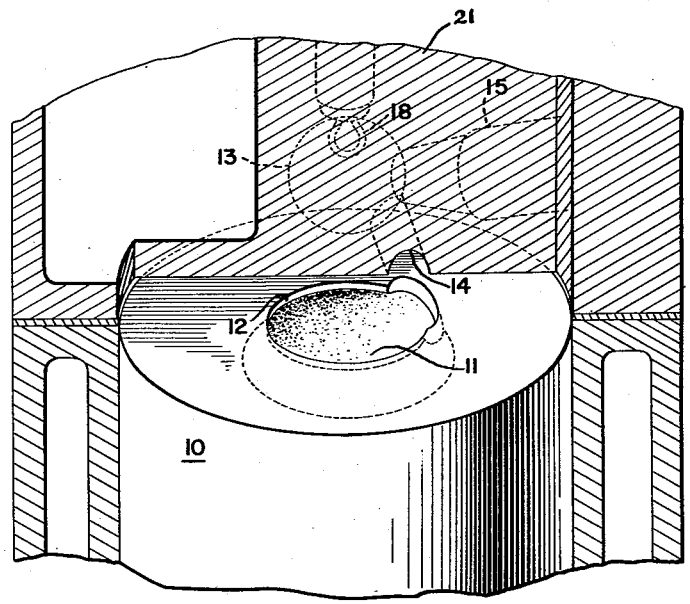
Figure 1 is a perspective view, with certain parts partially broken away, of the over-all arrangement of the piston and of some other parts located in the cylinder head which are associated with and most pertinent to the combustion process of an internal combustion engine according to the present invention, the section being taken along line 1—1 of Figure 3.

Referring now more particularly to the drawings, wherein like reference numerals are used throughout the various views to designate like parts, reference numeral 10 designates the piston which contains in the piston head thereof the main combustion chamber 11 having the shape of approximately a body of revolution with respect to the longitudinal axis of the piston. The main combustion chamber 11 is provided with a circular opening 12 facing the cylinder head 21.

The cylinder head 21 contains an auxiliary ignition chamber 13 from which a communicating passage 14 leads to the main combustion chamber 11. The communicating passage 14 is disposed partly within the cylinder head 21 and partly within the piston 10. The communicating passage 14 terminates eccentrically in the circular opening 12 and therewith in the main combustion chamber 11.

An injection nozzle 15 of any suitable construction terminates substantially in the transition portion between the auxiliary chamber 13 and the communicating passage 14. Two fuel jets or groups of jets 16 and 17 are discharged from injection nozzle 15, namely, jet 16 which is directed essentially diagonally across the auxiliary chamber 13 while jet 17 is directed along the walls of the communicating passage 14 into the main combustion chamber 11, in such a manner that it is also guided along the walls thereof and more particularly in a clockwise direction of rotation as viewed from above in top plan view.

A rotary movement in the clockwise direction is also imparted to the inflowing suction air flowing into the main combustion chamber 11 in any suitable manner (not shown), for example, by giving to the air intake parts in the cylinder head an appropriate direction or by partially shielding the air intake valve, etc.

The jet 16 serves for purposes of ignition of the charge, while jet 17 effects the main combustion properly speaking. Jets 16 and 17 may be each of a single jet or may consist each also of a plurality of jets from the same injection nozzle. For possibly aiding the ignition during starting or with an extremely cold engine, a glow plug 18 may be incorporated in the auxiliary chamber 13.

Figure 4:
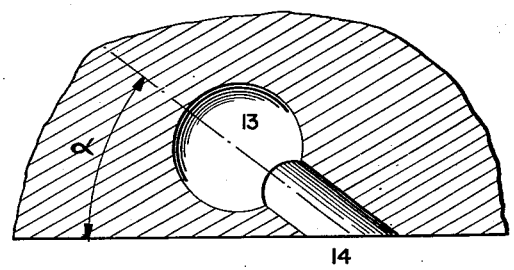
Figure 4 is a cross-sectional view through the communicating passage along line 4—4 of Figure 3.
Figure 2:
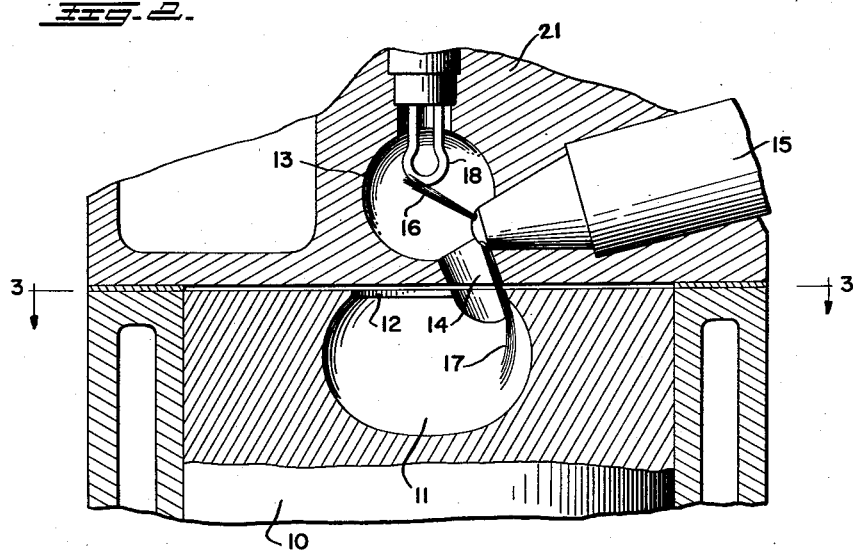
Figure 2 is a longitudinal cross-sectional view through the piston and cylinder head.
Figure 3:
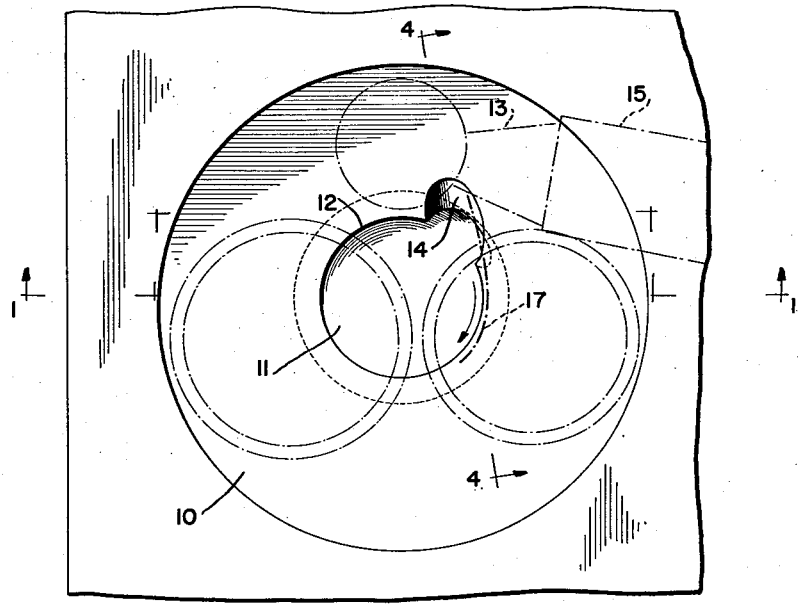
Figure 3 is a top view of the piston.

Ordinarily, the jets 16 and 17 which may contain different amounts of fuel are also injected at different times. Normally, the jet 16 contains a smaller quantity of fuel than jet 17 although it may also be desirable under certain circumstances to provide more fuel in jet 16 than in jet 17. Moreover, the relative timing of the two jets 16 and 17 depends on the particular engine, amount of fuel injected in each jet, engine temperature, type of fuel, etc. Thus, normally jet 16 is injected first while jet 17 is injected only thereafter at such a time as to have properly vaporized a substantial portion of the fuel in jet 17 when the main combustion process begins. However, it is also understood that in some cases it may be desirable to first inject jet 17 and only thereafter inject jet 16 so as to obtain a certain combustion process. The angle α formed by the communicating passage 14 (Figure 4) may be between 25° to 45°.

Furthermore, instead of a single injection nozzle provided with an appropriate number of apertures to produce two jets or groups of jets, two separate injection nozzles may be provided, one for each jet or group of jets 16 and 17, respectively.

While I have shown one preferred embodiment of my invention, it is understood that the same is not limited thereto but is susceptible of many changes and modifications within the scope of a person skilled in the art, and I intend to cover all such changes and modifications except as encompassed by the appended claims.

I claim:

1. In an internal combustion engine of the compression ignition type comprising a main combustion chamber, an auxiliary combustion chamber having a shape essentially of a body of revolution, channel means forming a communicating passage between said main combustion chamber and said auxiliary combustion chamber to provide continuous communication therebetween, fuel injecting means to inject a first portion of the fuel across said auxiliary combustion chamber and a second portion of said fuel along the walls of said channel means, said channel means discharging into said main combustion chamber essentially tangentially.

2. In an internal combustion engine of the compression ignition type comprising a main combustion chamber having the shape essentially of a body of revolution, an auxiliary combustion chamber having a shape essentially of a body of revolution, channel means forming a communicating passage between said main combustion chamber and said auxiliary combustion chamber to provide continuous communication therebetween, fuel injecting means to inject a first portion of the fuel across said auxiliary combustion chamber and a second portion of said fuel along the walls of said channel means, said channel means discharging into said main combustion chamber essentially tangentially, said fuel injection means including at least one nozzle having a plurality of spray holes.

3. In an internal combustion engine of the compression ignition type comprising a main combustion chamber having the shape essentially of a body of revolution, an auxiliary combustion chamber having a shape essentially of a body of revolution, channel means forming a communicating passage between said main combustion chamber and said auxiliary combustion chamber to provide continuous communication therebetween, fuel injecting means to inject a first portion of the fuel across said auxiliary combustion chamber and a second portion of said fuel along the walls of said channel means, said channel means discharging into said main combustion chamber essentially tangentially, the injection of said first fuel portion commencing at a different time than the injection of said second fuel portion.

4. In an internal combustion engine of the compression ignition type comprising a main combustion chamber having the shape essentially of a body of revolution, an auxiliary combustion chamber having a shape essentially of a body of revolution, channel means forming a communicating passage between said main combustion chamber and said auxiliary combustion chamber to provide continuous communication therebetween, fuel injecting means to inject a first portion of the fuel across said auxiliary combustion chamber and a second portion of said fuel along the walls of said channel means, said channel means discharging into said main combustion chamber essentially tangentially, the quantity of said first fuel portion being different from said second fuel portion.

5. In an internal combustion engine of the compression-ignition type having a cylinder with a piston therein and a cylinder head, comprising a main combustion chamber formed in the piston head of said piston, said main combustion chamber having the shape essentially of a body of revolution, an auxiliary combustion chamber arranged within said cylinder head, channel means forming a communicating passage between said main combustion chamber and said auxiliary combustion chamber to provide continuous communication therebetween, a fuel injection device with at least one nozzle for injecting a first portion of said fuel across said auxiliary chamber and the second portion along the walls of said communicating passage into said main combustion chamber, said main combustion chamber, communicating passage and second fuel spray being so arranged in relation to each other that the fuel discharge from said communicating passage into said main combustion chamber is directed essentially tangentially along the walls of the main combustion chamber and is guided therealong.

6. In an internal combustion engine, the combination according to claim 5, wherein said auxiliary combustion chamber is formed as a spherical turbulence chamber.

7. In an internal combustion engine, the combination according to claim 5, wherein said auxiliary combustion chamber is formed as a precombustion chamber.

8. In an internal combustion engine, the combination according to claim 5, wherein said nozzle has a plurality of spray holes.

9. In an internal combustion engine, the combination according to claim 5, wherein said nozzle is positioned near the transition portion between said auxiliary chamber and said channel means.

10. In an internal combustion engine, the combination according to claim 5, wherein the fuel injection device consists of a plurality of individual nozzles each having at least one spray hole.

11. In an internal combustion engine, the combination according to claim 5, further comprising a glow plug arranged within said auxiliary combustion chamber.

12. In an internal combustion engine, the combination according to claim 5, wherein the volume of said auxiliary chamber is between one-fourth to one-sixth of that of said main combustion chamber.

13. In an internal combustion engine, the combination according to claim 5, wherein injection of said first fuel portion commences at a different time than the injection of said second fuel portion.

14. In an internal combustion engine according to claim 5, wherein the quantity of said first fuel portion is different from that of said second fuel portion.

15. In an internal combustion engine according to claim 5, wherein said communicating passage is disposed in such a way that it forms an angle of 25 to 45 degrees with a plane perpendicular to the axis of said main combustion chamber.

16. In an internal combustion engine, the combination according to claim 15, wherein the mouth of said communicating passage is located eccentrically with respect to the axis of said main combustion chamber.

17. In an internal combustion engine, the combination according to claim 16, further comprising means for creating a rotation of the combustion air in said main combustion chamber in essentially the same direction as the direction of said second portion of fuel upon discharge thereof from said communicating passage.

18. In an internal combustion engine, the combination according to claim 1, further comprising means for producing rotation of the combustion air in said main combustion chamber in essentially the same direction as that of said second portion of fuel discharged from said communicating passage.

References Cited in the file of this patent

UNITED STATES PATENTS

| 2,169,381 | Chapman | Aug. 15, 1939 |

FOREIGN PATENTS

| 317,270 | Great Britain | Aug. 15, 1929 |
| 401,703 | Great Britain | Nov. 14, 1933 |
| 608,729 | Great Britain | Sept. 20, 1948 |
| 608,821 | Great Britain | Sept. 21, 1948 |